US012594759B2

(12) United States Patent
Nishikawa et al.

(10) Patent No.: US 12,594,759 B2
(45) Date of Patent: Apr. 7, 2026

(54) METHOD OF CREATING HEAD MODEL, DRIVE WAVEFORM CREATION METHOD, INFORMATION PROCESSING APPARATUS, AND PROGRAM

(71) Applicant: FUJIFILM Corporation, Tokyo (JP)

(72) Inventors: Baku Nishikawa, Kanagawa (JP); Yuta Mizouchi, Kanagawa (JP); Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 18/522,281

(22) Filed: Nov. 29, 2023

(65) Prior Publication Data

US 2024/0198667 A1 Jun. 20, 2024

(30) Foreign Application Priority Data

Dec. 14, 2022 (JP) ................................ 2022-199323

(51) Int. Cl.
*B41J 2/045* (2006.01)
*B41J 29/393* (2006.01)

(52) U.S. Cl.
CPC ....... *B41J 2/04588* (2013.01); *B41J 2/04581* (2013.01); *B41J 29/393* (2013.01)

(58) Field of Classification Search
CPC ... B41J 2/04588; B41J 2/04581; B41J 29/393
See application file for complete search history.

(56) References Cited

FOREIGN PATENT DOCUMENTS

| | | | |
|---|---|---|---|
| JP | 09174835 A | * | 7/1997 |
| JP | H09174835 | | 7/1997 |

OTHER PUBLICATIONS

Oikawa, Koichi et al., "Ink Jet Apparatus" (JP 09174835 A)—Machine Translation, Jul. 8, 1997, [Paragraphs 0014-0037] (Year: 1997).*

* cited by examiner

*Primary Examiner* — Lisa Solomon
(74) *Attorney, Agent, or Firm* — JCIPRNET

(57) ABSTRACT

A method of creating a head model that can accurately simulate behavior of a liquid ejection head, a drive waveform creation method of creating a proper drive waveform using the head model, and an information processing apparatus and a program for executing the methods are provided. Provided is a method of creating a head model that simulates behavior of a liquid ejection head including a piezoelectric element, the head model being configured using a fluid analysis model, the method including, via one or more first processors, optimizing the head model based on learning data using data related to an actual flight shape in a case of ejecting liquid by applying each of a plurality of drive waveforms to the piezoelectric element using the liquid ejection head and the liquid ejected from the liquid ejection head as the learning data.

20 Claims, 10 Drawing Sheets

METHOD OF CREATING HEAD MODEL, DRIVE WAVEFORM CREATION METHOD, INFORMATION PROCESSING APPARATUS, AND PROGRAM

CROSS-REFERENCE TO RELATED APPLICATION

The present application claims priority under 35 U.S.C § 119(a) to Japanese Patent Application No. 2022-199323 filed on Dec. 14, 2022, which is hereby expressly incorporated by reference, in its entirety, into the present application.

BACKGROUND OF THE INVENTION

1. Field of the Invention

The present disclosure relates to a method of creating a head model, a drive waveform creation method, an information processing apparatus, and a program, and particularly to an information processing technology for creating a head model that simulates behavior of a liquid ejection head of a piezoelectric type and to a drive waveform creation technology using a head model.

2. Description of the Related Art

In ink jet printing, in a case where ink to be used varies, a flight shape of ink ejected from an ink jet head changes even with a slight change in a physical property value. Thus, it has been a major object to acquire a favorable flight characteristic. The flight characteristic may include, for example, landing position accuracy, whether or not a satellite droplet is present, a droplet speed, a droplet amount, and stability. Since the ink jet head that ejects ink by driving a piezoelectric element has a degree of freedom in a drive waveform, a developer generally executes optimization of the drive waveform for each ink to be used.

However, optimizing the drive waveform to have a plurality of favorable flight characteristics at the same time requires a developer to have professional knowledge and experience. In addition, optimization that accompanies trial and error requires an enormous amount of time.

Regarding the above object, attempts have been made to shorten the time of optimization of the drive waveform in the related art. JP1997-174835A discloses a method of creating a drive waveform that optimizes (minimizes) an evaluation function related to a flight characteristic of ink using an equation of motion (equivalent circuit) of an ink jet head.

SUMMARY OF THE INVENTION

The method disclosed in JP1997-174835A assumes that a circuit constant of the equation of motion is set in advance. However, since the circuit constant of the equation of motion varies for each ink to be used, it is required to obtain an optimal circuit constant with which behavior of each ink can be favorably simulated. Derivation of the optimal circuit constant requires an enormous amount of time. Consequently, creating an optimal drive waveform for each ink requires an enormous amount of time.

In addition, in the case of searching for the optimal drive waveform, a method of preparing a drive waveform group in advance as candidates and determining the optimal drive waveform by evaluating the flight characteristic with respect to each drive waveform in the drive waveform group in order based on past knowledge or the like of the developer has been generally performed in the related art. However, in this method, since scope of search is restricted to the candidate drive waveform group prepared in advance, it is impossible to search for a drive waveform that is completely unknown.

The above object is not limited to an ink jet apparatus for printing application and is a common object for apparatuses using a liquid ejection head that ejects various types of functional liquid.

The present disclosure is conceived in view of such circumstances, and an object thereof is to provide a method of creating a head model that can accurately simulate behavior of a liquid ejection head, a drive waveform creation method of creating a proper drive waveform using the head model, and an information processing apparatus and a program for executing the methods.

A method of creating a head model according to a first aspect of the present disclosure is a method of creating a head model that simulates behavior of a liquid ejection head including a piezoelectric element, the head model being configured using a fluid analysis model, the method comprising, via one or more first processors, optimizing the head model based on learning data using data related to an actual flight shape in a case of ejecting liquid by applying each of a plurality of drive waveforms to the piezoelectric element using the liquid ejection head and the liquid ejected from the liquid ejection head as the learning data.

According to the first aspect, optimization of the head model is executed by the one or more first processors using the data related to the actual flight shape as the learning data with respect to a combination of the liquid used for ejection and the liquid ejection head. Accordingly, the head model that can accurately simulate behavior of ejection with respect to the combination of the liquid to be ejected and the liquid ejection head can be constructed.

The term "optimization" means approximation to an optimal state and is not limited to actual reaching to the optimal state.

A method of creating a head model according to a second aspect is provided such that in the method of creating a head model according to the first aspect, the head model may be a model in which an equivalent circuit model and the fluid analysis model are connected to each other.

According to the second aspect, a calculation cost can be suppressed, compared to the case of the head model configured using only the fluid analysis model.

A method of creating a head model according to a third aspect is provided such that in the method of creating a head model according to the second aspect, the one or more first processors may be configured to optimize a parameter related to a circuit constant of the equivalent circuit model and to at least one of a viscosity coefficient, surface tension, or density of the fluid analysis model.

A method of creating a head model according to a fourth aspect is provided such that in the method of creating a head model according to any one of the first to third aspects, the one or more first processors may be configured to update a parameter of the head model such that a flight shape predicted by the head model with respect to input of each of the plurality of drive waveforms approximates the actual flight shape.

A method of creating a head model according to a fifth aspect is provided such that in the method of creating a head model according to any one of the first to fourth aspects, the data related to the actual flight shape may be a flight shape image obtained by imaging the liquid ejected from the liquid ejection head.

A method of creating a head model according to a sixth aspect is provided such that in the method of creating a head model according to any one of the first to fourth aspects, the data related to the actual flight shape may be a flight shape image group in time series obtained by imaging the liquid ejected from the liquid ejection head at at least two time points.

A method of creating a head model according to a seventh aspect is provided such that in the method of creating a head model according to the sixth aspect, the one or more first processors may be configured to calculate a first evaluation value based on the flight shape at at least two time points as an indicator of the optimization.

A method of creating a head model according to an eighth aspect is provided such that in the method of creating a head model according to any one of the first to seventh aspects, a parameter of the drive waveform may be configured to include at least one of a pulse width, a slope, a pulse height, or a pulse interval.

A drive waveform creation method according to a ninth aspect is a drive waveform creation method using a head model created by executing the method of creating a head model according to any one of the first to eighth aspects, the drive waveform creation method comprising, via one or more second processors, predicting flight of the liquid using the head model with respect to each of a plurality of new drive waveforms, and executing processing of determining a drive waveform suitable for ejection of the liquid based on a flight prediction result with respect to each of the plurality of new drive waveforms.

A drive waveform creation method according to a tenth aspect is provided such that in the drive waveform creation method according to the ninth aspect, the one or more second processors may be configured to calculate a second evaluation value from the flight prediction result, and determine an optimal drive waveform from among the plurality of new drive waveforms based on the second evaluation value.

A drive waveform creation method according to an eleventh aspect is provided such that in the drive waveform creation method according to the tenth aspect, the second evaluation value may be configured to include a flight characteristic characterized by at least one of a droplet amount, a droplet speed, or a length of a thread of at least one of a mother droplet or a satellite droplet.

A drive waveform creation method according to a twelfth aspect is provided such that in the drive waveform creation method according to the tenth or eleventh aspect, the one or more second processors may be configured to determine a drive waveform that has the second evaluation value satisfying a designated condition and that has a most promising second evaluation value among the plurality of new drive waveforms.

A drive waveform creation method according to a thirteenth aspect is provided such that in the drive waveform creation method according to any one of the ninth to twelfth aspects, the one or more second processors may be configured to perform forward prediction of predicting a flight shape of the liquid from each of the plurality of new drive waveforms using the optimized head model and determine a drive waveform suitable for ejection of the liquid from among the plurality of new drive waveforms based on the flight prediction result of the forward prediction.

An information processing apparatus according to a fourteenth aspect is an information processing apparatus that executes the method of creating a head model according to any one of the first to eighth aspects, the information processing apparatus comprising the one or more first processors, and one or more first storage devices in which the head model is stored.

A program according to a fifteenth aspect causes a computer to execute the method of creating a head model according to any one of the first to eighth aspects.

An information processing apparatus according to a sixteenth aspect is an information processing apparatus that executes the drive waveform creation method according to any one of the ninth to thirteenth aspects, the information processing apparatus comprising the one or more second processors, and one or more second storage devices in which the optimized head model is stored.

A program according to a seventeenth aspect causes a computer to execute the drive waveform creation method according to any one of the ninth to thirteenth aspects.

According to the present disclosure, the head model that can accurately simulate the behavior of ejection with respect to the combination of the liquid to be used and the liquid ejection head can be created. In addition, according to the present disclosure, the drive waveform with which a desired flight characteristic is obtained can be efficiently created using the created head model.

DESCRIPTION OF THE PREFERRED EMBODIMENTS

Hereinafter, an embodiment of the present invention will be described in detail in accordance with the accompanying drawings.

Summary of Embodiment

In the present embodiment, examples of a method and an apparatus for creating a head model that simulates behavior of an ink jet head comprising a piezoelectric element, and a method and an apparatus for searching for a drive waveform with which a desired flight characteristic is obtained using the head model will be described.

Figure 1:
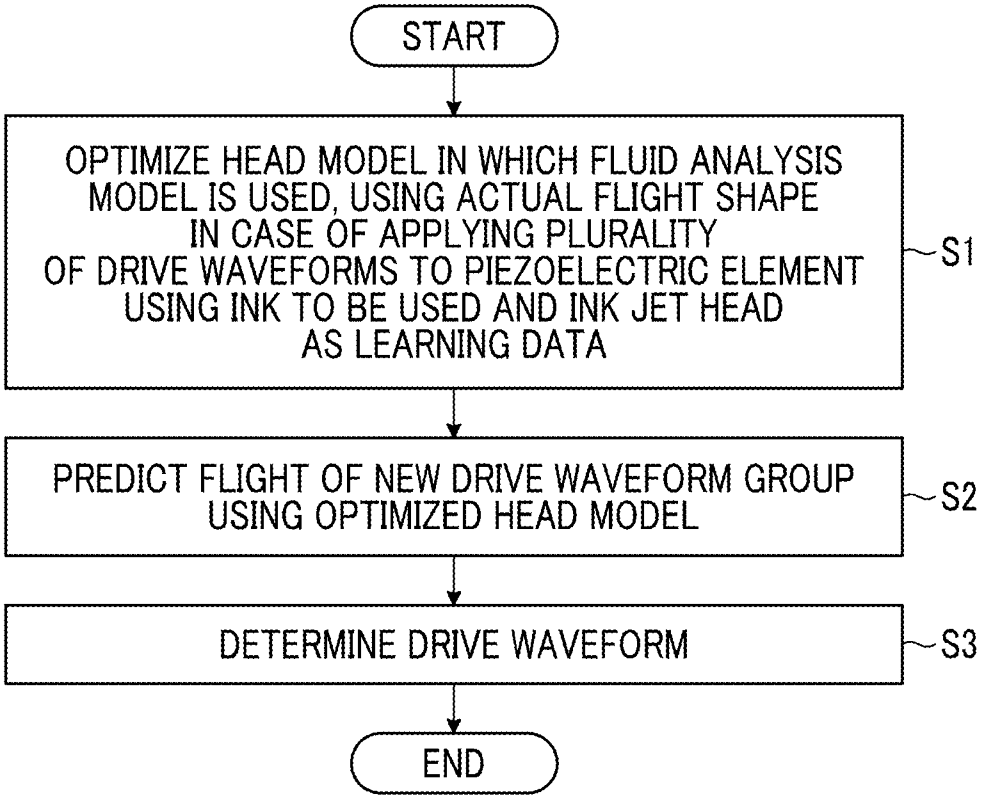
FIG. 1 is a flowchart illustrating a processing procedure of a method of creating a head model and a drive waveform creation method according to an embodiment.

FIG. 1 is a flowchart illustrating a processing procedure of a method of creating a head model and a drive waveform creation method according to the embodiment. Each step of steps S1 to S3 illustrated in FIG. 1 is executed by one or more processors. Here, an example of executing processing (step S1) of optimizing the head model via a first processor and then executing processing (step S2 and step S3) of searching for an optimal drive waveform using the optimized head model via a second processor different from the first processor will be described. The first processor may also execute step S2 and step S3 instead of the second processor. In addition, the second processor may execute step S2, and a third processor different from the second processor may execute step S3.

As illustrated in FIG. 1, in step S1, the first processor optimizes the head model that uses a fluid analysis model, using an actual flight shape in the case of ejecting ink by applying each of a plurality of drive waveforms to the piezoelectric element using a combination of the ink to be used and the ink jet head as learning data.

Then, in step S2, the second processor predicts flight of a new drive waveform group using the optimized head model. That is, the second processor simulates an ejection operation of the ink with respect to various drive waveforms by inputting each of a plurality of new drive waveforms into the optimized head model.

In step S3, the second processor determines the most promising drive waveform based on a flight prediction result (simulation result) obtained from the processing of step S2. Hereinafter, each step of step S1 to step S3 will be described in further detail.

Step S1: Optimization of Head Model

In order to execute the processing of step S1, it is preferable to collect in advance and prepare data related to the flight shape of the ink in the case of applying each of the plurality of drive waveforms to the piezoelectric element as a data set for learning by conducting an ejection experiment or the like using the combination of the ink to be used and the ink jet head. The first processor optimizes parameters of the head model by learning an actual flight shape from the data set.

Example of Drive Waveform

Figure 2:
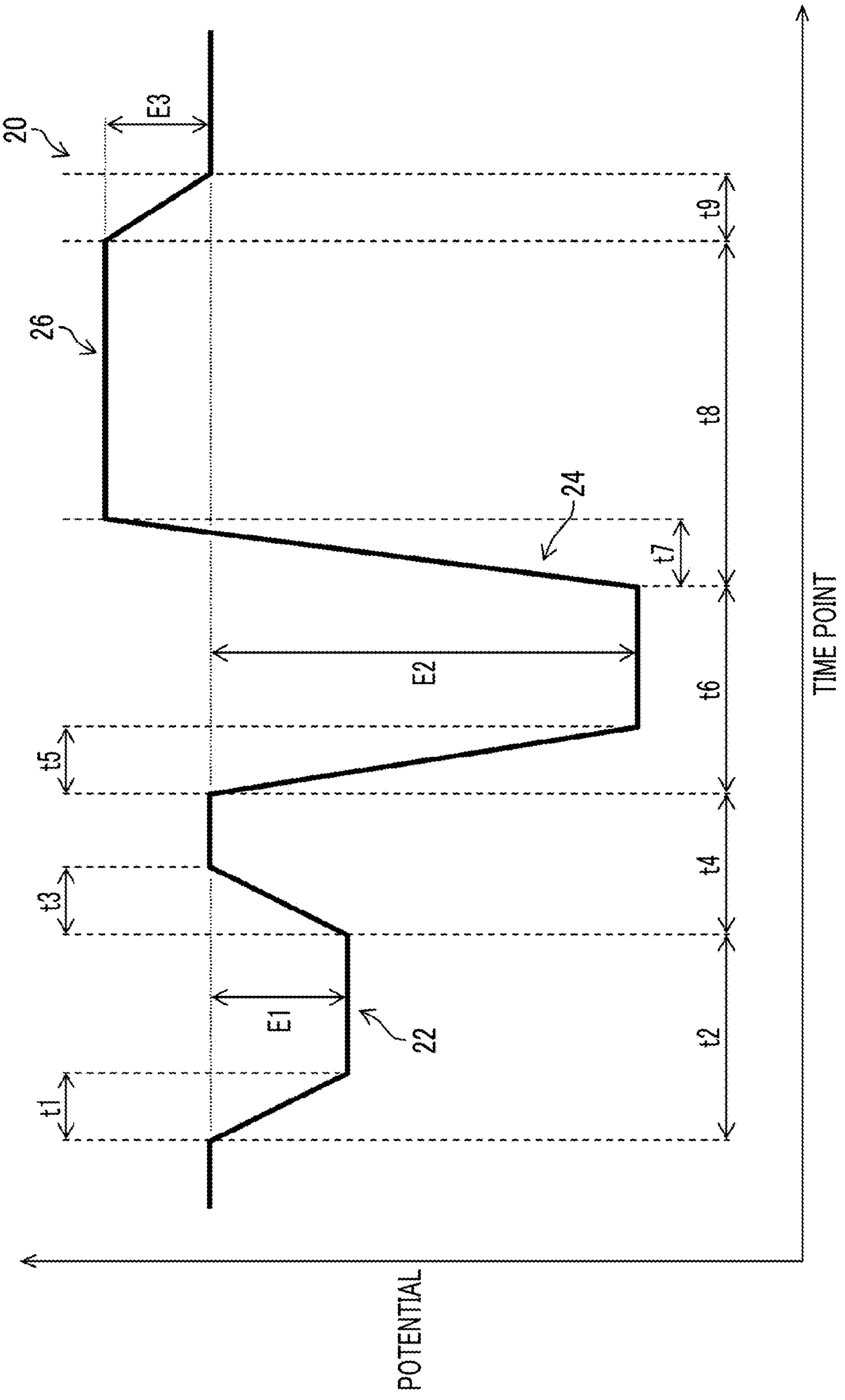
FIG. 2 is a waveform diagram illustrating an example of a drive waveform.

FIG. 2 is a waveform diagram illustrating an example of a drive waveform. A horizontal axis denotes a time point, and a vertical axis denotes a potential. A drive waveform 20 illustrated in FIG. 2 includes a preliminary vibration pulse 22, an ejection pulse 24, and a residual effect suppression pulse 26. A pulse width, a slope, a pulse height, and a pulse interval of each of the preliminary vibration pulse 22, the ejection pulse 24, and the residual effect suppression pulse 26 are parameters of the drive waveform. In the example of the drive waveform 20 illustrated in FIG. 2, there are 12 parameters including times t1 to t9 for defining the pulse widths, the slopes, and the pulse intervals and potential differences E1 to E3 for defining the pulse heights of the pulses.

A plurality of drive waveforms having different combinations of values of the parameters are applied to the piezoelectric element of the ink jet head filled with the ink to be used, and the flight shape of the ejected ink is used as the learning data.

The parameters of the drive waveform are not limited to the types (12 types) in the example illustrated in FIG. 2. For example, the potential of the drive waveform may be changed in a curved manner together with the time point, and a shape of a curve may be included in the parameters. Types of the drive waveforms used in learning may be, for example, 100 types.

Example of Flight Shape

Figure 3:
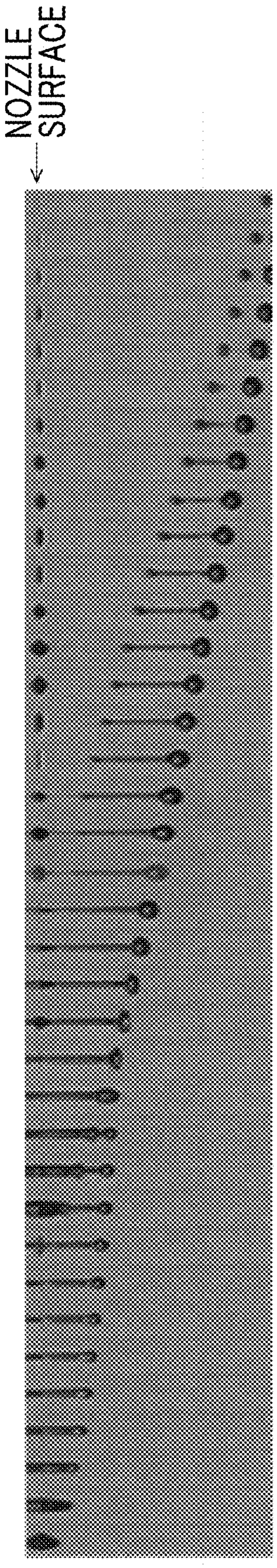
FIG. 3 is an image example of a flight shape of ink ejected from an ink jet head.

FIG. 3 is an image example of the flight shape of the ink ejected from the ink jet head. FIG. 3 illustrates the flight shape at each time point perceived from a time series image group obtained by continuously imaging the ink ejected from the ink jet head by applying the drive waveform at a certain time interval. FIG. 3 illustrates an example of images captured at an interval of 1 microsecond. An example of the certain time interval is 1 microsecond.

It is desirable to set, as an imaging region, a region sufficient for acquiring the flight characteristic from a nozzle that is an ink outlet. In order to perceive a mode of flight in a time series direction (time axis direction), imaging is performed at the certain time interval, and imaging is performed with the number of steps (the number of imaging operations) in which an ink droplet is almost partially cut off outside a screen. Thus, images corresponding to the number of time series are obtained with respect to one drive waveform. FIG. 3 is an example in which regions of interest are cropped from the images corresponding to the number of time series and are arranged in time series.

It is preferable that color contrast between color of an ink region and a background region is as clear as possible considering subsequent image processing. In addition, it is preferable that resolution of a region that is a boundary between the ink droplet and the background region is sharp.

As illustrated in FIG. 3, ejection of the ink starts from the nozzle of the ink jet head to form a liquid column, and the ink is separated from the nozzle to fly while deforming into a droplet shape.

The flight shape corresponding to each drive waveform is obtained by acquiring the time series image group in accordance with each of the plurality of drive waveforms, and the flight shapes are used as the learning data.

Summary of Head Model

Figure 4:
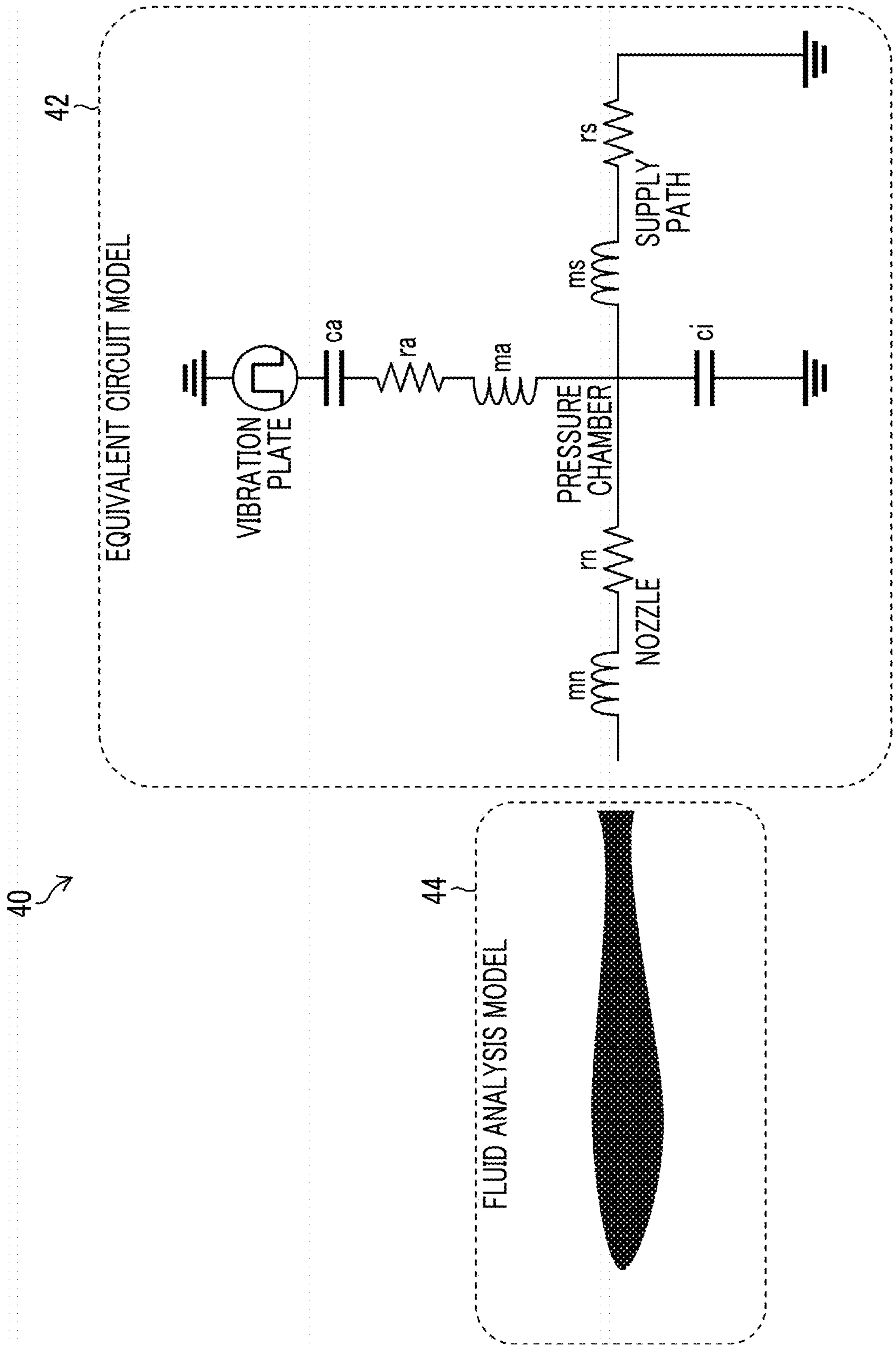
FIG. 4 is a schematic diagram of the head model according to the embodiment.

FIG. 4 is a schematic diagram of a head model 40 according to the embodiment. The head model 40 has a configuration in which an equivalent circuit model 42 and a fluid analysis model 44 are connected to each other. The head model can also be configured using only the fluid analysis model by also applying the fluid analysis model to the part corresponding to the equivalent circuit model 42. However, in a case where the head model is configured with only the fluid analysis model, a calculation cost is significantly increased. Thus, in the present embodiment, the head model 40 is configured by connecting the equivalent circuit model 42 and the fluid analysis model 44 to each other. That is, it is configured to simulate ink behavior inside a head flow channel via the equivalent circuit model 42, simulate ink behavior after ejection via the fluid analysis model 44, and connect the equivalent circuit model 42 and the fluid analysis model 44 to each other in a nozzle part.

Symbols of circuit parameters in the equivalent circuit model 42 illustrated in FIG. 4 have the following meanings. That is, ma, ra, and ca denote inertance, resistance, and compliance of a vibration plate, respectively, and ms and rs denote inertance and resistance of a supply path, respectively. In addition, ci denotes compliance of a pressure chamber, and mn, and rn denote inertance and resistance of the nozzle part, respectively. The equivalent circuit model 42 in FIG. 4 is an example, and a form of the equivalent circuit model varies depending on the ink jet head to be used.

An ejection simulation technique that connects the equivalent circuit model to the fluid analysis model in which a computational fluid dynamic (CFD) technique is used has been known. In the CFD technique, a three-dimensional space in which ink is ejected can be divided into small spaces (a mesh or a lattice), and a motion of the ink in each small space can be simulated by simultaneously solving an equation of conservation of mass and an equation of conservation of momentum (equation of motion) in each small space. Consequently, ejection of the ink as a free surface fluid and a motion of flight can be simulated.

The CFD technique has a high calculation cost. Thus, in the case of the head model configured using a three-dimensional fluid analysis model, an enormous amount of time is required to perform the processing of optimizing the model (step S1) and to predict the flight using the optimized head model (step S2).

Therefore, in the present embodiment, it is preferable to quickly simulate ejection of the ink and the motion of the flight by applying an idea such as executing the CFD technique in axial symmetry in two dimensions instead of three dimensions to the fluid analysis model 44.

Learning Method

In the case of optimizing the head model 40 using the learning data, the first processor optimizes the parameters of the head model 40 such that the flight shape (a predicted flight shape predicted using the head model 40) obtained by simulation using the head model 40 and the drive waveforms included in the learning data as input approximates the actual flight shape.

Here, the parameters of the head model 40 include each circuit constant of the equivalent circuit model 42, a viscosity coefficient, surface tension, and density of the ink in the fluid analysis model 44. Among these parameters, a parameter that is known by measurement or calculation in advance may be fixed and excluded from parameters to be optimized. In addition, unknown parameters other than the parameters of the head model 40 may be included in optimization.

The first processor can optimize the parameters of the head model 40 using an evaluation value based on a difference between the actual flight shape perceived from the learning data and the flight shape obtained as a simulation result of the head model 40. Specifically, the first processor obtains a total of the number of regions having no overlap of the ink by comparing the actual flight shape with the simulated flight shape at each time point of the flight shape in time series included in the learning data. A value obtained by accumulating the totals obtained at all time points is used as a first evaluation value. By incorporating the difference between the actual flight shape and the simulated flight shape at a plurality of time points into the first evaluation value in such a manner, the captured image obtained by imaging an ejection state of the ink can be effectively used as the learning data.

The first processor optimizes the parameters of the head model 40 such that the first evaluation value obtained in such a manner is decreased. There are various methods such as the method of steepest descent in optimization techniques. However, since multiple local optimal solutions are present for the parameters of the head model 40, it is preferable to perform optimization using a technique for finding a global optimal solution. Research on global optimization techniques has been conducted for a long time, and multiple techniques have been suggested. Optimization is performed using, for example, a genetic algorithm as a global optimization technique.

Figure 5:
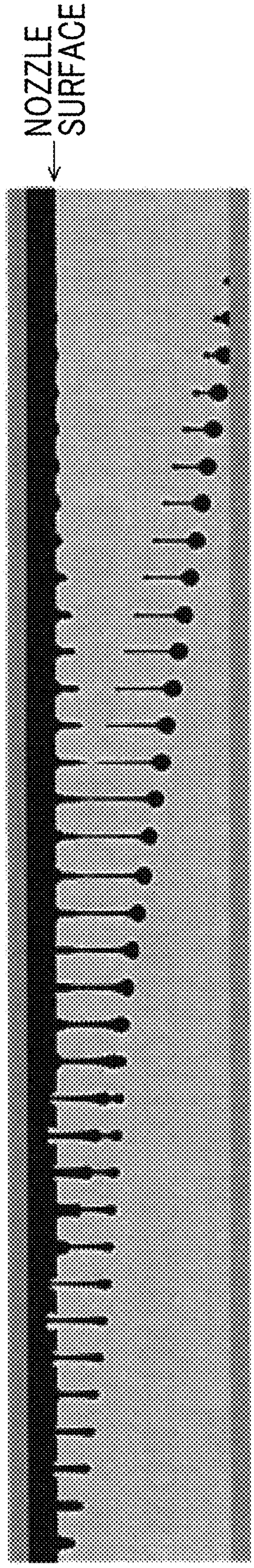
FIG. 5 is a diagram illustrating an example of a prediction result of the flight shape obtained by simulation using the head model that is optimized according to the present embodiment.

FIG. 5 is an example of the flight shape simulated by inputting the same drive waveform as that in the ejection operation in FIG. 2 into the head model 40 that is optimized according to the present embodiment.

As is perceived from comparison between the simulation result (predicted flight shape) illustrated in FIG. 5 and the actual flight shape illustrated in FIG. 3, the head model 40 optimized according to the present embodiment can accurately simulate behavior of the real ink jet head.

Step S2: Creation of Plurality of New Drive Waveforms and Evaluation of Flight Shape In step S2, the second processor simulates the flight shape of the ink for each drive waveform by inputting each waveform of the new drive waveform group into the optimized head model 40 and obtains the flight characteristic such as a droplet amount, a droplet speed, a position, and a length of a thread of a mother droplet and of a satellite droplet from the simulation result. The term "thread" may be referred to as "liquid column". As a method of setting the new drive waveform group, a "method of setting a plurality of levels for each parameter of the drive waveform and setting all combinations thereof" or a "method of randomly setting a level of each parameter of the drive waveform" is used. The parameters of the drive waveform are the pulse width, the slope, the pulse height, the pulse interval, and the like of each pulse, as described above, and are, for example, the 12 parameters illustrated in the example in FIG. 2.

Figure 6:
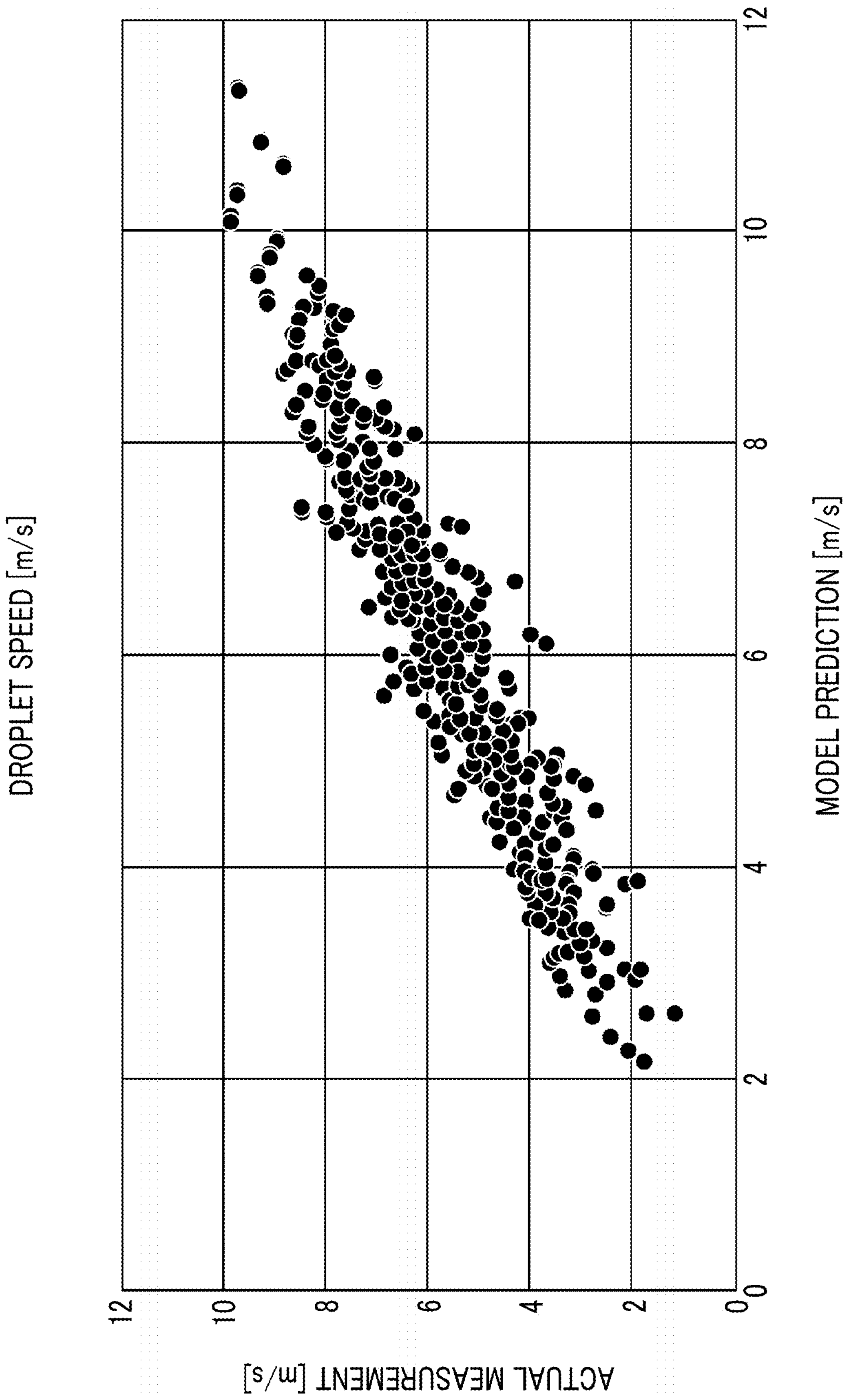
FIG. 6 illustrates a scatter plot in which a droplet speed predicted using the head model optimized according to the present embodiment and an actual droplet speed are compared with each other.

FIG. 6 illustrates an example of a result in which the inventors of the present application have optimized the head model 40 using the actual flight shape of the ink ejected by applying approximately 100 levels of the drive waveform to the ink jet head as the learning data and obtained the flight characteristic (predicted the flight) of the new drive waveform group of approximately 400 levels using the optimized head model 40.

FIG. 6 illustrates a scatter plot in which the droplet speed predicted using the head model 40 optimized according to the present embodiment and an actual droplet speed are compared with each other. The droplet speed here is a collective droplet speed of the mother droplet and the satellite droplet. According to FIG. 6, it is perceived that the droplet speed can be predicted with high accuracy by the head model 40 optimized in step S1. That is, it is found that the head model 40 optimized according to the present embodiment can perform prediction with accuracy such that a correlation between the droplet speed predicted by the model and the actual droplet speed is greater than or equal to 0.95.

Step S3: Determination of Promising Drive Waveform

In step S3, the second processor determines the drive waveform having a flight characteristic satisfying a certain level of quality or higher and having the most promising flight characteristic from each flight prediction result of the new drive waveform group. A criterion of the "certain level" for determining an allowable range of the target flight characteristic may be a determination criterion designated in advance or may be designated from a user interface or the like, as necessary. For example, the second processor determines the drive waveform having the largest droplet amount or the highest droplet speed from the drive waveform group that has each of the droplet amount and the droplet speed higher than or equal to the certain level without generating the satellite droplet. The certain level designated with respect to the target flight characteristic is an example of a "designated condition". A value of the flight characteristic (characteristic value) used as an indicator in the case of determining the optimal drive waveform is an example of a second evaluation value according to the embodiment of the present disclosure.

It is not required to record all of the flight prediction results of the new drive waveform group in step S2. The prediction result may be recorded with respect to only the drive waveform having the flight characteristic satisfying the certain level of quality or higher. By doing so, it is possible to reduce a memory capacity required for recording and efficiently determine the drive waveform in step S3.

Example of Hardware Configuration of Information Processing Apparatus

The processing of step S1 to step S3 can be executed by a computer system including one or a plurality of computers.

Figure 7:
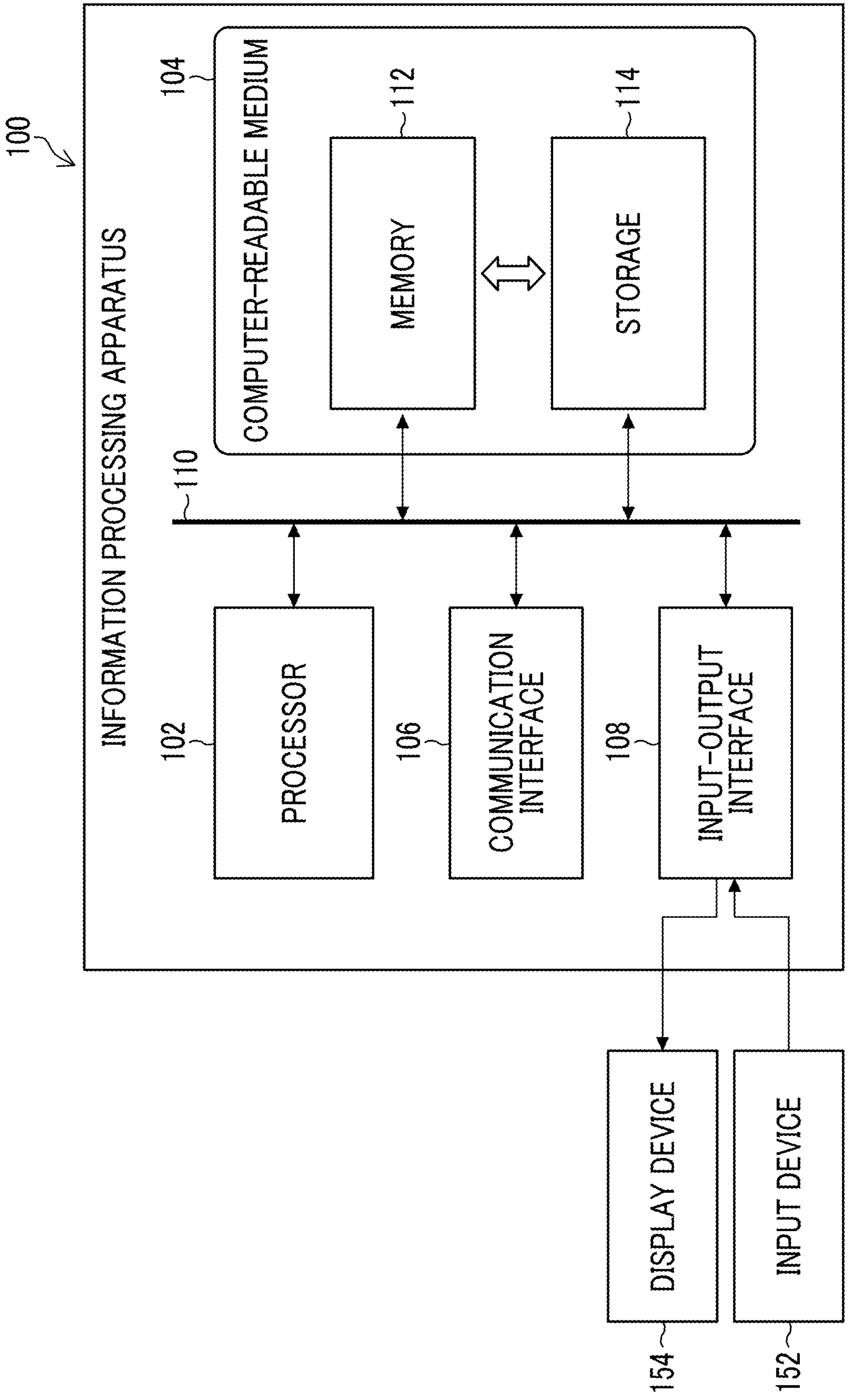
FIG. 7 is a block diagram illustrating an example of a hardware configuration of an information processing apparatus that executes at least a part of processing of the method of creating the head model and the drive waveform creation method according to the embodiment.

FIG. 7 is a block diagram illustrating an example of a hardware configuration of an information processing apparatus 100 that executes at least a part of the processing of the method of creating the head model and the drive waveform creation method according to the embodiment.

The information processing apparatus 100 comprises a processor 102, a computer-readable medium 104 that is non-transitory and tangible, a communication interface 106, an input-output interface 108, and a bus 110. The processor 102 is connected to the computer-readable medium 104, the communication interface 106, and the input-output interface 108 through the bus 110. A form of the information processing apparatus 100 is not particularly limited and may be a server, a personal computer, a workstation, a tablet terminal, or the like.

The processor 102 may be at least one of the first processor or the second processor. The processor 102 includes a central processing unit (CPU). The processor 102 may include a graphics processing unit (GPU). The computer-readable medium 104 includes a memory 112 that is a main storage device, and a storage 114 that is an auxiliary storage device. The computer-readable medium 104 may be, for example, a semiconductor memory, a hard disk drive (HDD) device, a solid state drive (SSD) device, or a combination of a plurality thereof. The computer-readable medium 104 is an example of a "first storage device" and a "second storage device" according to the embodiment of the present disclosure.

The computer-readable medium 104 stores a plurality of programs, data, and the like for performing various types of processing. The term "program" includes a concept of a program module. The processor 102 functions as various processing units by executing instructions of the programs stored in the computer-readable medium 104.

The information processing apparatus 100 may be connected to an electric communication line, not illustrated, through the communication interface 106. The electric communication line may be a wide area communication line, an on-premise communication line, or a combination thereof.

The information processing apparatus 100 may comprise an input device 152 and a display device 154. The input device 152 is composed of, for example, a keyboard, a mouse, a multi-touch panel, other pointing devices, a voice input device, or an appropriate combination thereof. The display device 154 is composed of, for example, a liquid crystal display, an organic electro-luminescence (organic EL (OEL)) display, a projector, or an appropriate combination thereof. The input device 152 and the display device 154 are connected to the processor 102 through the input-output interface 108.

Method of Collecting Learning Data

Figure 8:
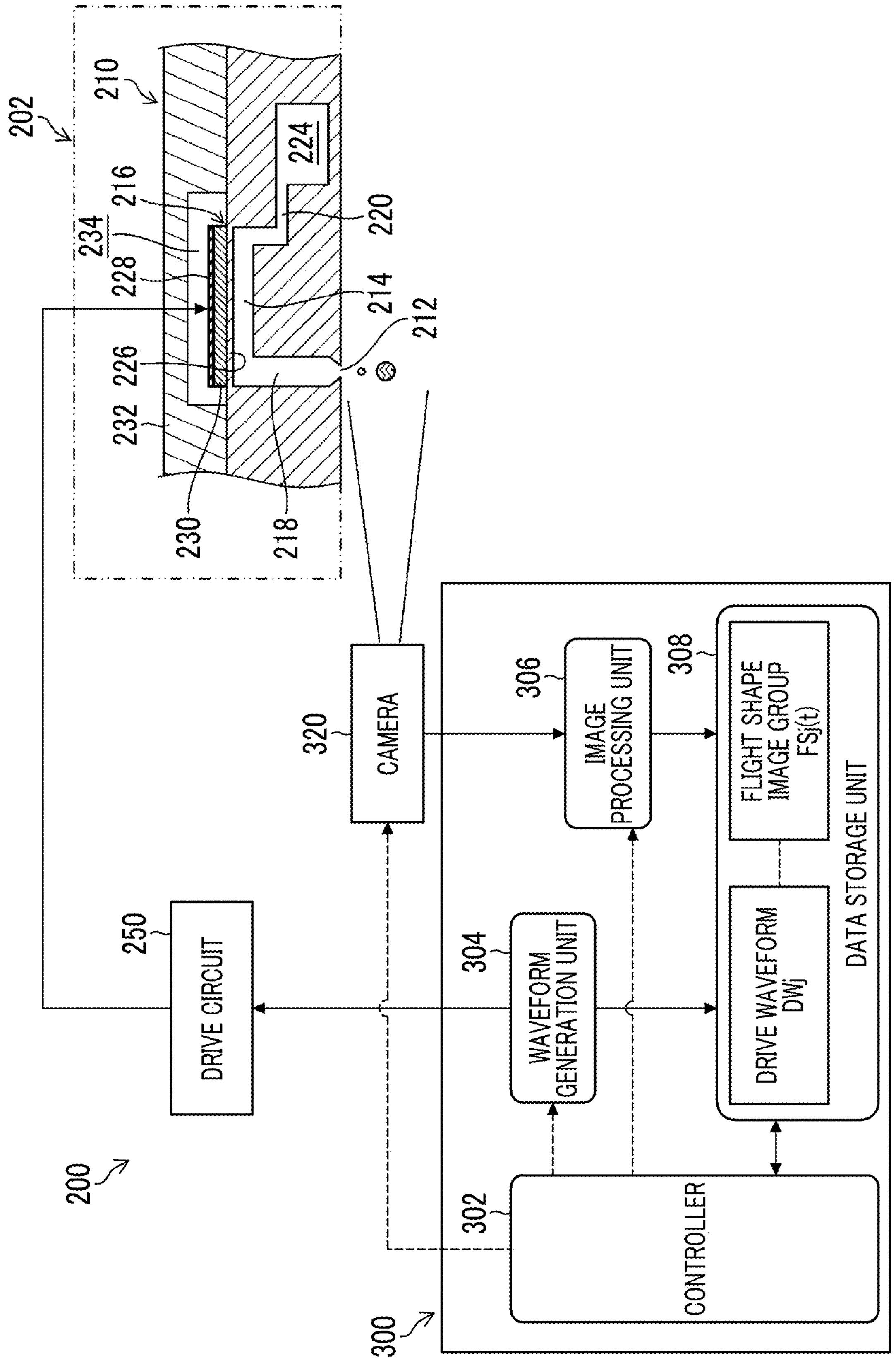
FIG. 8 is a descriptive diagram schematically illustrating a configuration example of an ink jet apparatus used in an ejection experiment for creating a data set for learning used in optimization of the head model.

FIG. 8 is a descriptive diagram schematically illustrating a configuration example of an ink jet apparatus 200 used in the ejection experiment for creating the data set for learning used in optimization of the head model.

The ink jet apparatus 200 comprises an ink jet head 202, a drive circuit 250, an information processing apparatus 300, and a camera 320.

While a three-dimensional structure of one ejector 210 in the ink jet head 202 is illustrated as a cross section view in FIG. 8, the ink jet head 202 comprises a plurality of ejectors 210. The ink jet head 202 is an example of a "liquid ejection head" according to the embodiment of the present disclosure. The ink jet apparatus 200 may be an apparatus for experiment or an ink jet printing apparatus used for printing.

The ejector 210 of the ink jet head 202 comprises a nozzle 212, a pressure chamber 214, and a piezoelectric element 216. The nozzle 212 communicates with the pressure chamber 214 through a nozzle flow channel 218. The pressure chamber 214 communicates with a supply-side common flow channel 224 through an individual supply path 220.

A vibration plate 226 constituting a ceiling of the pressure chamber 214 comprises a conductive layer, not illustrated, that functions as a common electrode corresponding to a lower electrode of the piezoelectric element 216. The pressure chamber 214, wall parts of other flow channel parts, and the vibration plate 226 can be made of silicon.

A material of the vibration plate 226 is not limited to silicon, and the vibration plate 226 may be formed of a non-conductive material such as resin. The vibration plate 226 itself may be formed of a metal material such as stainless steel and be used as a vibration plate that doubles as the common electrode.

A piezoelectric unimorph actuator is composed of a structure in which the vibration plate 226 is laminated with the piezoelectric element 216. The piezoelectric element 216 is connected to the drive circuit 250 and is driven by a drive voltage supplied from the drive circuit 250. A volume of the pressure chamber 214 is changed by deforming a piezoelectric body 230 to bend the vibration plate 226 via application of the drive voltage to an individual electrode 228 that is an upper electrode of the piezoelectric element 216. A change in pressure caused by the change in the volume of the pressure chamber 214 acts on the ink to eject the ink from the nozzle 212.

In a case where the piezoelectric element 216 is restored to an original state after ejection of the ink, the pressure chamber 214 is filled with new ink from the supply-side common flow channel 224 through the individual supply path 220. The ink jet head 202 may comprise an ink collection path, not illustrated, for collecting the ink not used in ejection.

A plan-view shape of the pressure chamber 214 is not particularly limited and may be a quadrangular shape, other polygonal shapes, a circular shape, an elliptical shape, or the like. A cover plate 232 is provided above the individual electrode 228. The cover plate 232 is a member that secures a movable space 234 of the piezoelectric element 216 and that seals a space around the piezoelectric element 216.

A supply-side ink chamber, not illustrated, and a collection-side ink chamber, not illustrated, are formed above the cover plate 232. The supply-side ink chamber is connected to the supply-side common flow channel 224 through a communication path, not illustrated. The collection-side ink chamber is connected to a collection-side common flow channel, not illustrated, through a communication path, not illustrated.

The information processing apparatus 300 that controls the ejection operation of the ink jet head 202 includes a controller 302, a waveform generation unit 304, an image processing unit 306, and a data storage unit 308. The information processing apparatus 300 may include the drive circuit 250. A hardware configuration of the information processing apparatus 300 may be the same as that in FIG. 7. A processing function of each unit of the information processing apparatus 300 may be implemented by executing the instructions of the programs via the processor 102.

The information processing apparatus 300 is connected to the camera 320. The camera 320 is disposed at a position at which a flight state of the ink ejected from the nozzle 212 can be imaged. The controller 302 controls the entire system including the ink jet head 202 and the camera 320. The waveform generation unit 304 may generate drive waveforms DWj of various waveforms in accordance with an instruction from the controller 302. For example, the waveform generation unit 304 may generate a plurality of drive waveforms DWj obtained by varying the combination of the values of the 12 parameters described in FIG. 2. Subscript j denotes an index for identifying the plurality of drive waveforms. For example, in the case of generating 100 types of the drive waveforms DWj, j takes an integer of 1 to 100.

The drive circuit 250 supplies the drive voltage of the drive waveform DWj generated by the waveform generation unit 304 to the piezoelectric element 216. By driving the piezoelectric element 216 in such a manner, the ink is ejected from the nozzle 212. The camera 320 images the flight state of the ink ejected from the nozzle 212 at the certain time interval. The controller 302 controls an imaging timing of the camera 320 in synchronization with driving of the piezoelectric element 216. An image group in time series captured by the camera 320 is transmitted to the image processing unit 306.

The image processing unit 306 generates a flight shape image group FSj(t) in time series showing the flight shape of the ink by performing required processing such as extraction of the region of interest and crop processing with respect to the acquired images. Subscript t denotes a time point in time series.

The controller 302 stores the drive waveform DWj and the flight shape image group FSj(t) in the data storage unit 308 by associating (linking) the drive waveform DWj with the flight shape image group FSj(t). In such a manner, a data set including the plurality of drive waveforms DWj and a plurality of the flight shape image groups FSj(t) corresponding to the plurality of drive waveforms DWj, respectively, is created. A part or the entirety of the data set is used as the data set for learning. Such a data set is created for each combination of the ink to be used and the ink jet head 202.

Method of Creating Head Model

Figure 9:
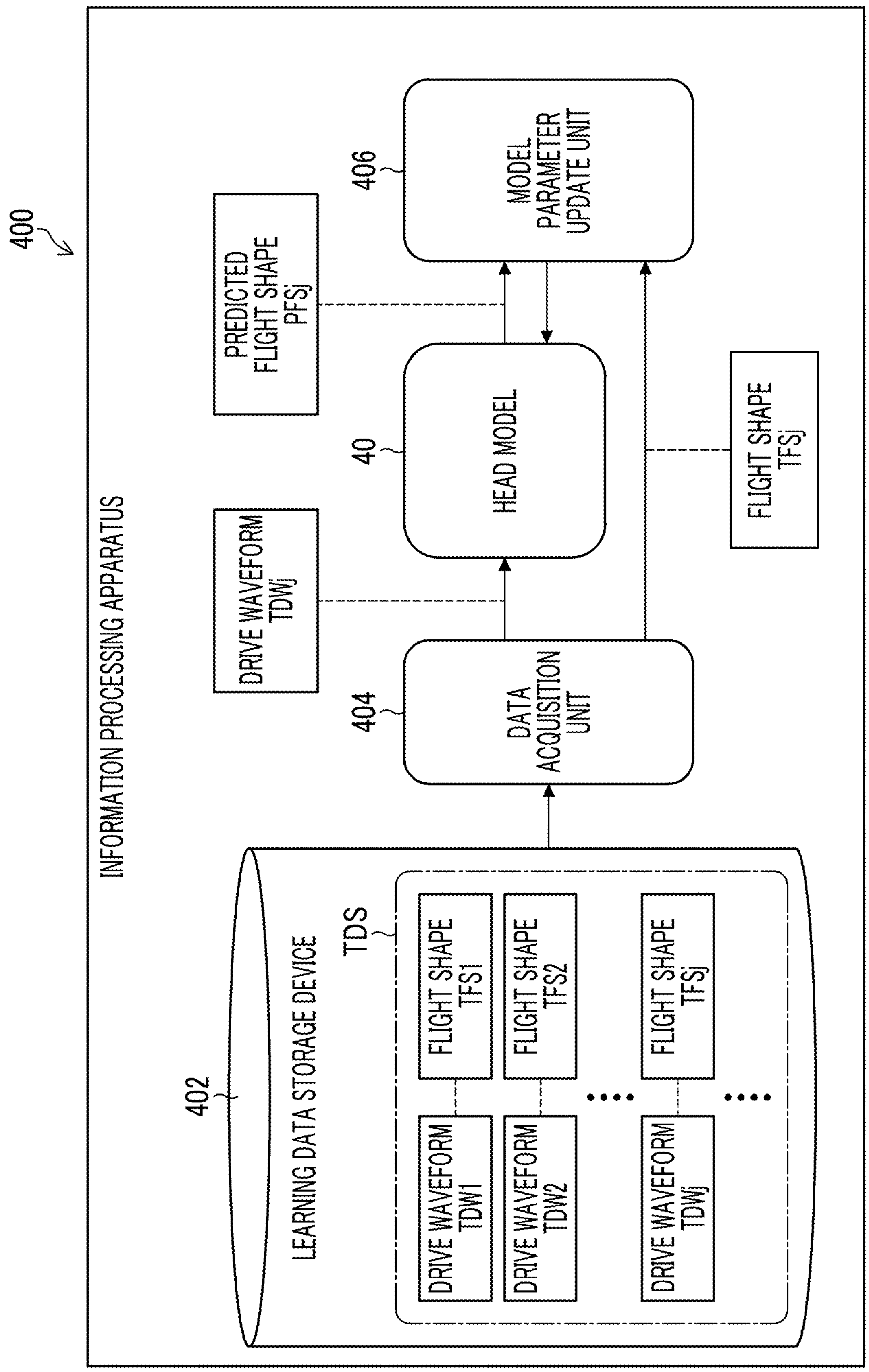
FIG. 9 is a block diagram schematically illustrating a functional configuration of an information processing apparatus that executes processing of optimizing the head model.

FIG. 9 is a block diagram schematically illustrating a functional configuration of an information processing apparatus 400 that executes processing of optimizing the head model 40. A hardware configuration of the information processing apparatus 400 may be the same as the configuration described in FIG. 7. A processing function of each unit of the information processing apparatus 400 is implemented by executing the instructions of the programs via the processor 102.

The information processing apparatus 400 includes a learning data storage device 402, a data acquisition unit 404, the head model 40, and a model parameter update unit 406. The learning data storage device 402 stores a learning data set TDS including a plurality of sets of data in which a drive waveform TDWj and a flight shape TFSj corresponding to the drive waveform TDWj are linked with each other. The drive waveform TDWj and the flight shape TFSj corresponding to the drive waveform TDWj may be the drive waveform DWj and the flight shape image group FSj(t) in time series collected using the method described in FIG. 7.

The data acquisition unit 404 acquires the learning data from the learning data storage device 402. The drive waveform TDWj acquired through the data acquisition unit 404 is input into the head model 40.

The head model 40 is actually a program and causes a computer to implement a function of simulating the behavior of the ink jet head 202. The head model 40 receives input of the drive waveform TDWj and outputs a predicted flight shape PFSj as a simulation result by simulating the ejection operation of the ink via application of the drive waveform TDWj. The predicted flight shape PFSj may be referred to as a flight prediction result.

The model parameter update unit 406 performs processing of calculating an evaluation value representing a difference between the predicted flight shape PFSj and the correct answer (actual) flight shape TFSj by comparing both with each other, processing of calculating update amounts of the parameters of the head model 40 based on the evaluation value, and processing of updating the parameters of the head model 40 in accordance with the calculated update amounts. The parameters of the head model 40 are referred to as model parameters.

By updating the model parameters a plurality of times using a plurality of pieces of the learning data, the model parameters of the head model 40 are optimized, and the head model 40 that can accurately predict the flight shape is created. A corresponding head model 40 is created for each combination of the ink to be used and the ink jet head 202.

Drive Waveform Search Method Using Optimized Head Model 40

Figure 10:
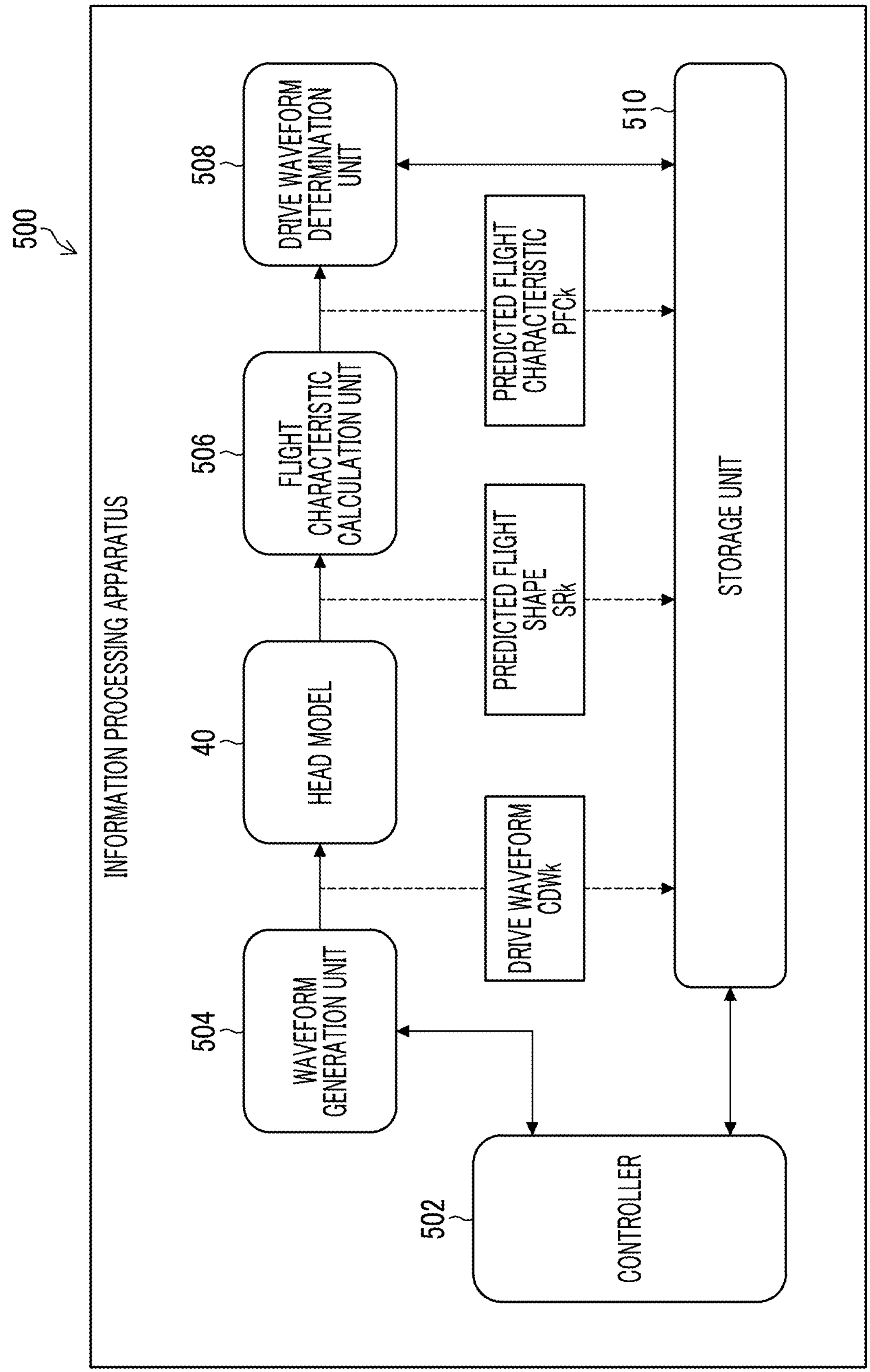
FIG. 10 is a block diagram schematically illustrating a functional configuration of an information processing apparatus that executes processing of determining a promising drive waveform using the head model optimized according to the present embodiment.

FIG. 10 is a block diagram schematically illustrating a functional configuration of an information processing apparatus 500 that executes processing of determining the promising drive waveform using the head model 40 optimized according to the present embodiment. A hardware configuration of the information processing apparatus 500 may be the same as the configuration described in FIG. 7. A processing function of each unit of the information processing apparatus 500 may be implemented by executing the instructions of the programs via the processor 102.

The information processing apparatus 500 includes a controller 502, a waveform generation unit 504, the head model 40, a flight characteristic calculation unit 506, a drive waveform determination unit 508, and a storage unit 510. The controller 502 controls overall processing of each unit. The controller 502 instructs the waveform generation unit 504 to generate a new drive waveform.

The waveform generation unit 504 generates a plurality of drive waveforms CDWk of various waveforms in accordance with designation from the controller 502. Subscript k is an index for identifying the drive waveforms. For example, in the case of generating 400 types of drive waveforms, k may take an integer of 1 to 400.

The head model 40 is a model that is optimized using the information processing apparatus 400 described in FIG. 9. The head model 40 receives input of the drive waveform CDWk and outputs a predicted flight shape SRk as a simulation result by simulating the ejection operation of the ink. That is, forward prediction of the flight is performed from the drive waveform CDWk using the head model 40. The flight characteristic calculation unit 506 calculates the flight characteristic from the predicted flight shape SRk output by the head model 40. The flight characteristic calculated from the predicted flight shape SRk will be referred to as a "predicted flight characteristic PFCk". Each of the predicted flight shape SRk and the predicted flight characteristic PFCk is an example of the flight prediction result predicted using the head model 40.

The controller 502 links the drive waveform CDWk, the predicted flight shape SRk, and the predicted flight characteristic PFCk with each other and stores these data in the storage unit 510. In such a manner, a collection of data including the plurality of drive waveforms CDWk (k=1, 2 . . . ) and a plurality of the predicted flight shapes SRk and a plurality of the predicted flight characteristics PFCk corresponding to the plurality of drive waveforms CDWk, respectively, is stored in the storage unit 510.

The drive waveform determination unit 508 determines the promising drive waveform based on the predicted flight characteristic PFCk. The drive waveform determination unit 508 determines the drive waveform that has the predicted flight characteristic PFCk satisfying the allowable range of the flight characteristic set in advance and that achieves the most favorable flight characteristic as the optimal drive waveform. For example, the drive waveform determination unit 508 determines the optimal drive waveform based on the evaluation value of the flight characteristic characterized by at least one of the droplet speed, the droplet amount, or the length of the thread of the mother droplet and of the satellite droplet.

In a case where the predicted flight characteristic PFCk does not satisfy the condition of the allowable flight characteristic, the drive waveform may be excluded from candidates, and data of the drive waveform may not be stored in the storage unit 510.

A drive waveform suitable for ejection of the ink is created using the head model 40 corresponding to the combination of the ink to be used and the ink jet head 202.

Program That Operates Computer

A program that causes a computer to implement a part or all of the processing functions in each apparatus of the information processing apparatus 300, the information processing apparatus 400, and the information processing apparatus 500 can be recorded on a computer-readable medium such as an optical disc, a magnetic disk, a semiconductor memory, or other non-transitory tangible information storage media, and the program can be provided through the information storage medium.

In addition, instead of the aspect of providing the program by storing the program in the non-transitory tangible computer-readable medium, a program signal can be provided as a download service using an electric communication line such as the Internet.

Furthermore, a part or all of the processing functions in each of the above apparatuses may be implemented by cloud computing and can be provided as software as a service (Saas).

Hardware Configuration of Each Processing Unit

A hardware structure of a processing unit that executes various types of processing of the controller 302, the waveform generation unit 304, and the image processing unit 306 in the information processing apparatus 300, the data acquisition unit 404 and the model parameter update unit 406 in the information processing apparatus 400, and the controller 502, the waveform generation unit 504, the flight characteristic calculation unit 506, and the drive waveform determination unit 508 in the information processing apparatus 500 corresponds to, for example, various processors illustrated below.

The various processors include a CPU that is a general-purpose processor functioning as various processing units by executing a program, a GPU, a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or different types. For example, one processing unit may be composed of a plurality of FPGAs, a combination of a CPU and an FPGA, or a combination of a CPU and a GPU. In addition, a plurality of processing units may be composed of one processor. A first example of a plurality of processing units composed of one processor is, as represented by computers such as a client and a server, a form of one processor composed of a combination of one or more CPUs and software, in which the processor functions as a plurality of processing units. A second example is, as represented by a system on chip (SoC) and the like, a form of using a processor that implements functions of the entire system including a plurality of processing units in one integrated circuit (IC) chip. Accordingly, various processing units are configured using one or more of the various processors as a hardware structure.

Furthermore, the hardware structure of the various processors is more specifically an electric circuit (circuitry) in which circuit elements such as semiconductor elements are combined.

Advantage of Embodiment

According to the above embodiment, the following effects are obtained.

[1] Processing of optimizing the model parameters of the head model 40 with respect to the combination of the ink to be used and the ink jet head using the actual flight shape as the learning data is automated, and the head model 40 that can accurately simulate behavior of ejection can be created.

[2] Even a technician not having professional knowledge in creating the head model can create the high-performance head model 40.

[3] By automating processing of searching for the drive waveform using the optimized head model 40, even a technician not having professional knowledge in creating the drive waveform can create the drive waveform that can implement the certain level of the flight characteristic.

[4] A drive waveform that matches a purpose of a user can be selected. For example, in the case of emphasizing quality of solid printing, by setting a condition to be satisfied with respect to the flight characteristic in accordance with the purpose such as prioritizing the droplet amount and allowing the satellite droplet, the drive waveform suitable for the condition can be created.

[5] It is possible to make use for evaluating the ink. It has been difficult to rate quality of the ink based on whether optimization of the drive waveform is good or bad in the related art. However, according to the technique of the present embodiment, the ink can be compared using an indicator such as the number of candidate waveforms that result in a preferable flight characteristic.

[6] A high-quality drive waveform that is difficult to create using the method of creating the drive waveform performed by a technician in the related art can be found. That is, it is possible to search for a completely unknown drive waveform that is difficult to assume as a candidate by human effort.

[7] The promising drive waveform can be efficiently created within a small amount of time, compared to that in the method of creating the drive waveform performed by a technician in the related art.

Modification Example 1

An example of using the time series image group captured at the certain time interval as the data related to the actual flight shape has been described in the above embodiment. However, for example, one image in which the flight state of the ink after elapse of a predetermined time from application of the drive waveform is imaged can be used instead of the time series image group. It is desirable to set the predetermined time in this case such that the flight characteristic such as the droplet speed, the droplet amount, the length of the thread, and whether or not the satellite droplet is present with respect to the ink can be specified from a position of the ink captured in one image captured at the timing.

As described in the embodiment, by using the time series image group of two or more images at different time points, a more accurate flight characteristic such as the droplet speed can be perceived, and the head model 40 having high prediction accuracy can be created.

Modification Example 2

The data related to the actual flight shape used as the learning data is not limited to a captured image and may be, for example, information such as a feature amount obtained from two-dimensional image information such as a position of a tip end of the thread (liquid column) and the length of the thread, a characteristic value, or a numerical value indicating any physical quantity.

For example, an example of updating the model parameters of the head model 40 while evaluating an image overlap between the actual flight shape observed by the ejection experiment and the flight shape predicted by the head model 40 has been described in the above embodiment. However, the model parameters can be optimized by evaluating a difference between the actuality and the prediction using a parameter value (characteristic value) related to one or more flight characteristics such as the droplet amount or the droplet speed, instead of the method of evaluating the image overlap.

Since image information in time series has the largest information amount, and using the flight shape image group in time series minimizes information loss, optimizing the head model 40 by evaluating the image overlap using the flight shape image group in time series is expected to have higher prediction accuracy of the finally obtained head model 40.

On the other hand, as a more convenient technique, the head model 40 may be optimized using a parameter value such as the droplet amount obtained from the captured image.

Modification Example 3

The head model 40 optimized according to the present embodiment can be not only used for searching for the drive waveform but also used for, for example, evaluating the ink and supporting design of the ink jet head.

Apparatus Application Example

While an example of the ink jet apparatus used in ink jet printing has been described in the above embodiment, the application scope of the present invention is not limited to this example. The disclosed technology is applicable to an apparatus that ejects liquid using a piezoelectric type liquid ejection head regardless of a type of the liquid to be used and of application. For example, wide application can be made to liquid ejection apparatuses that draw various shapes or patterns using a functional liquid material (collectively referred to as "liquid"), such as a wiring line drawing apparatus that draws a wiring pattern of an electronic circuit, a manufacturing apparatus of various devices, a resist printing apparatus using resin liquid as functional liquid for ejection, a color filter manufacturing apparatus, and a microstructure forming apparatus that forms a microstructure using a material for material deposition.

Other

The present disclosure is not limited to the above embodiment, and various modifications can be made without departing from the gist of the technical idea of the disclosed technology.

EXPLANATION OF REFERENCES

20: drive waveform
22: preliminary vibration pulse
24: ejection pulse
26: residual effect suppression pulse
40: head model
42: equivalent circuit model
44: fluid analysis model
100: information processing apparatus
102: processor
104: computer-readable medium
106: communication interface
108: input-output interface
110: bus
112: memory
114: storage
152: input device
154: display device
200: ink jet apparatus
202: ink jet head
210: ejector
212: nozzle
214: pressure chamber
216: piezoelectric element
218: nozzle flow channel

220: individual supply path
224: supply-side common flow channel
226: vibration plate
228: individual electrode
230: piezoelectric body
232: cover plate
234: movable space
250: drive circuit
300: information processing apparatus
302: controller
304: waveform generation unit
306: image processing unit
308: data storage unit
320: camera
400: information processing apparatus
402: learning data storage device
404: data acquisition unit
406: model parameter update unit
500: information processing apparatus
502: controller
504: waveform generation unit
506: flight characteristic calculation unit
508: drive waveform determination unit
510: storage unit
DWj: drive waveform
CDWk: drive waveform
E1, E2, E3: potential difference
FSj: flight shape image group
FSj(t): flight shape image group
PFCk: predicted flight characteristic
PFSj: predicted flight shape
SRk: predicted flight shape
t1 to t9: time
TDS: learning data set
TDWj: drive waveform
TFSj: flight shape
ca: compliance of vibration plate
ra: resistance of vibration plate
ma: inertance of vibration plate
ms: inertance of supply path
mr: resistance of supply path
ci: compliance of pressure chamber
mm: inertance of nozzle part
mr: resistance of nozzle part
S1: step of method of creating head model
S2 and S3: step of drive waveform creation method

What is claimed is:

1. A method of creating a head model that simulates behavior of a liquid ejection head including a piezoelectric element, the head model being configured using a fluid analysis model, the method comprising:

via one or more first processors, optimizing the head model based on learning data using data related to an actual flight shape in a case of ejecting liquid by applying each of a plurality of drive waveforms to the piezoelectric element using the liquid ejection head and the liquid ejected from the liquid ejection head as the learning data.

2. The method of creating a head model according to claim 1, wherein the head model is a model in which an equivalent circuit model and the fluid analysis model are connected to each other.

3. The method of creating a head model according to claim 2, wherein the one or more first processors are configured to optimize a parameter related to a circuit constant of the equivalent circuit model and to at least one of a viscosity coefficient, surface tension, or density of the fluid analysis model.

4. The method of creating a head model according to claim 1, wherein the one or more first processors are configured to update a parameter of the head model such that a flight shape predicted by the head model with respect to input of each of the plurality of drive waveforms approximates the actual flight shape.

5. The method of creating a head model according to claim 1, wherein the data related to the actual flight shape is a flight shape image obtained by imaging the liquid ejected from the liquid ejection head.

6. The method of creating a head model according to claim 1, wherein the data related to the actual flight shape is a flight shape image group in time series obtained by imaging the liquid ejected from the liquid ejection head at at least two time points.

7. The method of creating a head model according to claim 6, wherein the one or more first processors are configured to calculate a first evaluation value based on the flight shape at at least two time points as an indicator of the optimization.

8. The method of creating a head model according to claim 1, wherein a parameter of the drive waveform includes at least one of a pulse width, a slope, a pulse height, or a pulse interval.

9. An information processing apparatus that executes the method of creating a head model according to claim 1, the information processing apparatus comprising:

the one or more first processors; and one or more first storage devices in which the head model is stored.

10. A non-transitory, computer-readable tangible recording medium which records thereon a program for causing, when read by a computer, the computer to execute the method of creating a head model according to claim 1.

11. A drive waveform creation method using a head model created by executing the method of creating a head model according to claim 1, the drive waveform creation method comprising:

via one or more second processors, predicting flight of the liquid using the head model with respect to each of a plurality of new drive waveforms; and executing processing of determining a drive waveform suitable for ejection of the liquid based on a flight prediction result with respect to each of the plurality of new drive waveforms.

12. The drive waveform creation method according to claim 11, wherein the one or more second processors are configured to:

calculate a second evaluation value from the flight prediction result; and determine an optimal drive waveform from among the plurality of new drive waveforms based on the second evaluation value.

13. The drive waveform creation method according to claim 12, wherein the second evaluation value includes a flight characteristic characterized by at least one of a droplet amount, a droplet speed, or a length of a thread of at least one of a mother droplet or a satellite droplet.

14. The drive waveform creation method according to claim 12, wherein the one or more second processors are configured to determine a drive waveform that has the second evaluation value satisfying a designated condition and that has a most promising second evaluation value among the plurality of new drive waveforms.

15. The drive waveform creation method according to claim 11, wherein the one or more second processors are configured to perform forward prediction of predicting a flight shape of the liquid from each of the plurality of new drive waveforms using the optimized head model and determine a drive waveform suitable for ejection of the liquid from among the plurality of new drive waveforms based on the flight prediction result of the forward prediction.

16. An information processing apparatus that executes the drive waveform creation method according to claim 11, the information processing apparatus comprising:

the one or more second processors; and one or more second storage devices in which the optimized head model is stored.

17. A non-transitory, computer-readable tangible recording medium which records thereon a program for causing, when read by a computer, the computer to execute the drive waveform creation method according to claim 11.

18. The method of creating a head model according to claim 1, wherein the head model predicts a flight shape of the liquid ejected from the liquid ejection head via application of a drive waveform.

19. The method of creating a head model according to claim 1, wherein a computational fluid dynamic technique is used in the fluid analysis model, and a motion of the flight of the liquid after ejection by the liquid ejection head is predicted using the computational fluid dynamic technique.

20. The method of creating a head model according to claim 1, wherein the one or more first processors are configured to optimize a parameter of the head model, including a parameter related to at least one of a viscosity coefficient, surface tension, or density of the fluid analysis model based on the learning data.

* * * * *